(12) United States Patent
Gao et al.

(10) Patent No.: US 10,246,331 B2
(45) Date of Patent: Apr. 2, 2019

(54) METHOD, APPARATUS AND SPECIAL PHOSPHORUS RECOVERY DEVICE FOR RECOVERING YELLOW PHOSPHORUS FROM ELECTRIC FURNACE PHOSPHORUS-PRODUCING FURNACE GAS

(71) Applicant: INTERMET TECHNOLOGIES CHENGDU CO., LTD, Chengdu, Sichuan (CN)

(72) Inventors: Lin Gao, Chengdu (CN); Tao Wang, Chengdu (CN); Dingjiang Guo, Chengdu (CN)

(73) Assignee: Intermet Technologies Chengdu Co., Ltd, Chengdu, Sichuan (CN)

( * ) Notice: Subject to any disclaimer, the term of this patent is extended or adjusted under 35 U.S.C. 154(b) by 112 days.

(21) Appl. No.: 15/107,829

(22) PCT Filed: Dec. 30, 2013

(86) PCT No.: PCT/CN2013/090983
§ 371 (c)(1),
(2) Date: Aug. 31, 2016

(87) PCT Pub. No.: WO2015/096177
PCT Pub. Date: Jul. 2, 2015

(65) Prior Publication Data
US 2017/0217773 A1  Aug. 3, 2017

(30) Foreign Application Priority Data

Dec. 27, 2013 (CN) .......................... 2013 1 0740690

(51) Int. Cl.
*B01D 53/00* (2006.01)
*B01D 53/22* (2006.01)
(Continued)

(52) U.S. Cl.
CPC .......... *C01B 25/047* (2013.01); *B01D 53/002* (2013.01); *B01D 53/229* (2013.01);
(Continued)

(58) Field of Classification Search
CPC ... C01B 25/047; C01B 25/027; B01D 53/229; B01D 53/002; B01J 19/088; B01J 2219/0879; B01J 2219/0805
See application file for complete search history.

(56) References Cited

U.S. PATENT DOCUMENTS 2,509,228 A * 5/1950 Hardin .................... C05B 13/02
266/286
3,723,608 A * 3/1973 Meurer ................. C01B 25/003
423/322

FOREIGN PATENT DOCUMENTS

CN         201665530 U  * 12/2010
CN         102721030 A  * 10/2012

* cited by examiner

*Primary Examiner* — Anthony J Zimmer
(74) *Attorney, Agent, or Firm* — Meng Ouyang

(57) ABSTRACT

A method, apparatus and special phosphorus recovery device for recovering yellow phosphorus from an electric furnace phosphorus-producing furnace gas without the use of a spray cooling mode during the condensation of the electric furnace phosphorus-producing furnace gas. The method comprises the steps: 1) dedusting and purifying the electric furnace phosphorus-producing furnace gas by using a dry-type dedusting system, so that the solid content of the electric furnace phosphorus-producing furnace gas in less than or equal to 10-50 mg/m³; 2) conveying the purified furnace gas to a phosphorus recovery device, the phosphorus recovery device being provided with a heat exchange chamber formed by a shell and a recuperator arranged inside the heat exchange chamber; 3) feeding into an internal flow path of the recuperator a low-temperature medium, which con- (Continued)

ducts non-mixed heat transfer with the furnace gas under the isolation of the recuperator, so that the yellow phosphorus is condensed, separated out, and then vastly attached to the surface of the recuperator, and the tail gas arising from heat exchange is discharged out of the phosphorus recovery device; and 4) feeding a high-temperature medium for replacing the low-temperature medium into the internal flow path of the recuperator.

7 Claims, 4 Drawing Sheets

(51) Int. Cl.
*B01J 19/08* (2006.01)
*C01B 25/027* (2006.01)
*C01B 25/047* (2006.01)
(52) U.S. Cl.
CPC ........... *B01J 19/088* (2013.01); *C01B 25/027* (2013.01); *B01J 2219/0805* (2013.01); *B01J 2219/0879* (2013.01)

US 10,246,331 B2

METHOD, APPARATUS AND SPECIAL PHOSPHORUS RECOVERY DEVICE FOR RECOVERING YELLOW PHOSPHORUS FROM ELECTRIC FURNACE PHOSPHORUS-PRODUCING FURNACE GAS

TECHNICAL FIELD

The invention relates to a method, an apparatus and a special recovery device for recovering yellow phosphorus from electric furnace phosphorus-producing furnace gas.

BACKGROUND

The yellow phosphorus production process by electric furnace in industry application is divided into the production process using phosphorus furnace with a large self baking electrode and the production process using phosphorus furnace with multiple electrodes. The two processes are different in terms of type and scale of the electric furnace, treatment requirements for the raw material fed into the furnace, and dust collection measures, but basically the same in respect to the main flow, i.e., delivering mixture proportioned by phosphate ore, silica and coke into an electric furnace, generating furnace gas by the reduction reaction of the mixture in the electric furnace, making furnace gas escape from the molten zone of reaction, discharging furnace gas with particle impurities of the mixture from the electric furnace after passing through the furnace gas filter layer formed by the continuously supplemented mixture in the upper part of the furnace, then obtaining yellow phosphorus product through dust removal, condensation and scrubbing, refining and separation process, and finally recovering or discharging tail gas.

Wherein, when the capacity of transformer of the electric furnace is generally 50,000-90,000 KVA, the output is generally more than 30,000 tons/yr., the self baking electric furnace is adopted. In the production process using phosphorus furnace with a large self baking electrode, the requirements are very stringent for raw materials fed into the furnace (e.g., moisture and particle size of coke fed into the furnace), lump ore cannot be directly fed into the furnace without pretreatment with sintering process and pelletization process, and the temperature of the generated furnace gas is generally higher than 350° C.; the furnace gas discharged from the electric furnace enters an electrostatic dust collector (i.e., dry dust removal), the dedusted and purified furnace gas (the dust content is generally about 50 mg/m$^3$) enters a condensation and recovery system to obtain crude phosphorous, and the crude phosphorous is refined in a crude phosphorous refining system to obtain yellow phosphorous product.

The capacity of the transformer and the output of the electric furnace in the production process using phosphorus furnace with multiple electrodes are much less than those in the process using phosphorus furnace with a large self baking electrode. When the capacity is generally less than 28,000 KVA and the output is 7,000-10,000 tons/yr., molding graphite electrode is adopted, and 6 or 7 three-phase graphite electrodes with a diameter of 500 mm or 600 mm are arranged; sintered material or pellet material is not required for raw material fed into the furnace. With drying pretreatment adopted, the lump ore is fed into the furnace and the furnace gas temperature is generally 100-170° C.; furnace gas discharged from the electric furnace is directly fed into the condensation and recovery system (i.e., wet dust removal), the condensed yellow phosphorus is turned into crude phosphorus after entering the collecting tank, and then the crude phosphorus is refined in the crude phosphorus refining system to obtain the yellow phosphorus product and much phosphorus sludge.

The above-mentioned production process using phosphorus furnace with a large self baking electrode can produce less phosphorus sludge and wastewater, but it has such disadvantages as large construction expenses for supporting facilities of the electrostatic dust collector, high operation and maintenance costs, high personnel technical requirements, and insufficiently treated dust in furnace gas resulting in exhaust problem of PM2.5 in the tail gas. Meanwhile, the production process using phosphorus furnace with multiple electrodes will produce much phosphorus sludge which is difficult to separate, and the dust content in tail gas is higher.

The applicant applying for the invention patent has provided one method and an apparatus using phosphorus furnace with multiple electrodes for yellow phosphorus production and the other method using phosphorus furnace with a large self baking electrode for yellow phosphorus production respectively in application documents No. 2013104546439 and No. 2013104548326 of Chinese patents. Since a dry dust removal system is used for dust removal and purification of electric furnace phosphorus-producing furnace gas in the two methods, and a filter provided with a porous membrane element is used for fine filtration of electric furnace phosphorus-producing furnace gas at high temperature in the dry dust removal system, very little phosphorus sludge is produced during the phosphorous production process by the two methods, and the dust content of tail gas can be reduced. However, because a spray cooling process is still adopted when the dedusted and purified furnace gas is condensed via the two methods, a certain amount of phosphorus sludge may be produced and a large amount of cooling water will be consumed, and a large amount of wastewater will be generated subsequently, resulting in the increased steam consumption during refining of crude phosphorus and the wastewater treatment problem. So far the yellow phosphorus production by electric furnace process is to produce crude phosphorus by the spray cooling process which has been written into the yellow phosphorus production specification.

SUMMARY OF THE INVENTION

The technical problem to be solved by the invention is to provide a method and an apparatus and a special phosphorus recovery device for recovering yellow phosphorous from electric furnace phosphorus-producing furnace gas so as to solve the common problems resulting from the current spray cooling process. The spray cooling process is not adopted in the method during condensation of electric furnace phosphorus-producing furnace gas. The invention further provides a method and an apparatus using phosphorus furnace with a large self baking electrode for yellow phosphorus production. The spray cooling process is not used when the method and the device are used for condensation of electric furnace phosphorus-producing furnace gas.

The method of the invention for recovering yellow phosphorous from electric furnace phosphorus-producing furnace gas comprises the steps of:

1) Using the dry dust removal system for dust removal and purification of the said electric furnace phosphorus-producing furnace gas while making sure that the temperature of electric furnace phosphorus-producing furnace gas is above the phosphorous steam dew point temperature in the electric furnace phosphorus-producing furnace gas, thereby making the solid content of the electric furnace phosphorus-producing furnace gas be less than 10-50 mg/m$^3$.

2) Delivering the purified furnace gas to a phosphorous recovery device which comprises a heat exchange chamber formed with the shell and a partition wall type heat exchanger arranged in the heat exchange chamber. The said electric furnace phosphorus-producing furnace gas is in full contact with the partition wall type heat exchanger after entering the heat exchange chamber.

3) Adding a low-temperature medium to the internal flow path of the partition wall type heat exchanger. The low-temperature medium and the said furnace gas are isolated by the partition wall type heat exchanger for heat transfer without being mixed, therefore, a large amount of yellow phosphorous is condensed, separated out and attached to the surface of the partition wall type heat exchanger, and the tail gas after heat exchange is discharged from the phosphorous recovery device.

4) Adding a high-temperature medium to the internal flow path of the partition wall type heat exchanger to replace the low-temperature medium. The high-temperature medium and yellow phosphorous adhered to the surface of the partition wall type heat exchanger can transfer heat without being mixed, therefore, the yellow phosphorous is melted and dripped into a phosphorous recovering tank on the bottom of the phosphorous recovery device, and then collected in the phosphorous recovering tank.

The above-mentioned method of the invention is to recover yellow phosphorous by condensation of electric furnace phosphorus-producing furnace gas by the following method instead of the spray cooling process of: using the partition wall type heat exchanger and adding low-temperature medium to make a large amount of yellow phosphorous be condensed, separated out and adhered to the surface of the partition wall type heat exchanger, adding high-temperature medium to make yellow phosphorous adhered to the surface of the partition wall type heat exchanger melted, dripped into the phosphorous recovering tank on the bottom of the phosphorous recovery device, and finally obtained so as to solve the problems of phosphorous sludge and wastewater and reduce time for refining crude phosphorous and consumption of steam.

In the above-mentioned method, the temperature of furnace gas inlet and that of tail gas outlet of the phosphorous recovery device should be controlled at 180-220° C. and 10-30° C. respectively. When the temperature of the furnace gas inlet of the phosphorous recovery device is lower than 180° C., phosphorous steam will be untimely condensed, resulting in reduction of recovery ratio of yellow phosphorous in the phosphorous recovery device; when the temperature of the furnace gas inlet of the phosphorous recovery device is lower than 220° C., it is not convenient for the phosphorous recovery device to rapidly condense phosphorous steam. When the temperature of the tail gas outlet of the phosphorous recovery device is controlled below 10° C., unnecessary difficulty of refrigeration will be increased; when the temperature of the tail gas outlet of the phosphorous recovery device is more than 30° C. phosphorous steam cannot be sufficiently condensed, resulting in reduction of recovery ratio of yellow phosphorous.

The said low-temperature medium and high-temperature medium can be selected from various cold media and heat media applicable to the invention. The actual verification shows that chilled brine as low-temperature medium and vapor as high-temperature medium can reach better effect.

When the said electric furnace phosphorus-producing furnace gas is produced by delivering the mixture proportioned by phosphate ore, silica and coke into the phosphorus furnace with multiple electrodes, generating furnace gas by the reduction reaction of the mixture in the phosphorus furnace with multiple electrodes, making furnace gas escape from the molten zone of reaction, discharging furnace gas with particle impurities of the mixture from the phosphorous furnace with multiple electrodes after passing through the furnace gas filter layer formed by the continuously supplemented mixture in the upper part of the furnace, the furnace gas temperature in the dry dust removal system is kept above the dew point temperature of the said phosphorous steam by installing the heat exchanger on the flue connecting the electric furnace and the dry dust removal system, or/and adjusting the thickness of the said furnace gas filter layer in the electric furnace, or/and adjusting the electrode power on the premise that the mixture is strictly treated.

The above-mentioned technical means for keeping the furnace gas temperature in the dry dust removal system above the dew point temperature of the said phosphorous steam includes the steps of: controlling the furnace gas temperature by the heat exchanger, adjusting the thickness of the said furnace gas filter layer in the electric furnace, and adjusting the electrode power on the premise that the mixture is strictly treated. The three steps can be combined or singly used. Since the furnace gas temperature generated from the phosphorus furnace with multiple electrodes is usually low, furnace gas shall be generally heated by the heat exchanger to keep the temperature of furnace gas to be filtered in the filter above the dew point temperature of the said phosphorous steam.

The filter layer of furnace gas is mainly used to reduce dust entrained in furnace gas. The filter layer of furnace gas was usually made thick in order to reduce the output of phosphorous sludge. Since the phosphorus furnace with multiple electrodes is used and the temperature of the produced furnace gas is usually low, the thickness of the filter layer of furnace gas should be reduced so as to keep the temperature of furnace gas to be filtered in the filter above the dew point temperature of the said phosphorus steam. As a result, the heat loss of furnace gas can be reduced when passing through the filter layer of furnace gas, thus improving the temperature of furnace gas to be filtered in the filter.

It had low requirements in treatment of raw materials fed into the furnace (e.g., moisture and particle size of coke fed into the furnace) when the phosphorus furnace with multiple electrodes is used, as a result, it would lead to increased adverse reactions and reduced output of yellow phosphorus in case of excessive electrode power. Therefore, if the temperature of the furnace gas to be filtered in the filter is kept above the dew point temperature of the said phosphorus steam by adjusting the electrode power, assuming the raw material is strictly treated (e.g., raw material is fed into the furnace after pretreatment by sintering process and pelletization process), the electrode power can be improved by increasing voltage and current under the circumstances.

Furthermore, the said dry dust removal system at least comprises a filter for filtering electric furnace phosphorus-producing furnace gas. The filter has a porous membrane element meeting the following operating conditions. In view of the filter, operations shall be carried out including:

① Operation during startup: injecting preheating inert gas into the filter to preheat the porous membrane element over the dew point temperature of the said phosphorus steam;

② Operation during normal running: inputting furnace gas to be filtered at the temperature above the dew point temperature of the said phosphorus steam into the filter and making the dust content of clean furnace gas below 10-20 mg/m$^3$ after filtration;
③ Operation during blowback: starting the blowback unit to inject inert gas for blowback at the temperature above the dew point temperature of the said phosphorus steam into the filter and controlling the pressure of inert gas for blowback at 0.2-1.0 MPa;
④ Operation during shutdown: injecting inert gas for replacement at the temperature above the dew point temperature of the said phosphorus steam into the filter, and keeping the porous membrane element free of paste pollution under the protection of inert gas for replacement.

When the temperature of furnace gas to be filtered in the filter is lower than the dew point temperature of the said phosphorus steam, phosphorus steam in furnace gas will be condensed and the filter cannot work as expected, therefore, furnace gas at the temperature above the dew point temperature of the said phosphorus steam shall be input into the filter in said method. In addition, when the said filter is applied to the filtering environment of the phosphorus furnace gas, the technical problems including paste membrane pollution of filter and duct jamming caused by condensation of phosphorus steam due to the temperature shock on the surface of sintering inorganic porous membrane element during startup, blowback and shutdown period of the filter shall also be overcome. Therefore, the above-mentioned means is adopted to inject inert gas for preheating, inert gas for blowback and inert gas for replacement at a certain temperature.

The obvious advantage for using the filter with porous membrane element also includes high dust collection precision. The requirement for dust collection precision of the filter shall be that the dust content of clean furnace gas is less than 10-20 mg/m$^3$ after filtration. In order to meet the requirement, the porous membrane element with corresponding aperture can be selected. The test shows that the best way to ensure stable operation of the porous membrane element for long time is to control the pressure of inert gas for blowback at 0.2-1.0 MPa when the dust content of clean furnace gas filtered by the filter is less than 20 mg/m$^3$ in the filtering environment of the phosphorus furnace gas.

In addition, the temperature of furnace gas to be filtered in the filter shall be preferably kept at 187.5-280° C. when the above-mentioned filter is used. When the temperature of furnace gas to be filtered in the filter is lower than 187.5° C., phosphorus steam in furnace gas is likely to be condensed and the filter cannot work as expected; when the temperature of furnace gas to be filtered in the filter is higher than 280° C., the recovery ratio of yellow phosphorus will be reduced. Furthermore, the recovery ratio of yellow phosphorus is high when the temperature of furnace gas to be filtered in the filter is preferably at 187.5-220° C.

The apparatus for recovering yellow phosphorus from electric furnace phosphorus-producing furnace gas comprises the dry dust removal system and the phosphorous recovery device connected with the dry dust removal system. The said dry dust removal system is used for dedusting and purifying the said electric furnace phosphorus-producing furnace gas when the temperature of the electric furnace phosphorus-producing furnace gas is above the dew point temperature of phosphorous steam in electric furnace phosphorus-producing furnace gas, as a result, the solid content of electric furnace phosphorus-producing furnace gas is less than 10-50 mg/m$^3$. The said phosphorous recovery device comprises the heat exchange chamber formed with the shell and the partition wall type heat exchanger arranged in the heat exchange chamber. The tail gas outlet and the furnace gas inlet connected with the output end of the dry dust removal system are arranged on the heat exchange chamber, the internal flow path of the partition wall type heat exchanger is connected with the low-temperature medium source and high-temperature medium source by a switchable unit respectively.

Furthermore, the said dry dust removal system comprises a filter for filtering electric furnace phosphorus-producing furnace gas. The filter has a porous membrane element meeting the following operating conditions. In view of the filter, operations shall be carried out including:
① Operation during startup: injecting preheating inert gas into the filter to preheat the porous membrane element in the filter over the dew point temperature of phosphorus steam in electric furnace phosphorus-producing furnace gas;
② Operation during normal running: inputting furnace gas to be filtered at the temperature above the dew point temperature of the said phosphorus steam into the filter and making the dust content of clean furnace gas below 10-20 mg/m$^3$ after filtration;
③ Operation during blowback: starting the blowback unit to inject inert gas for blowback at the temperature above the dew point temperature of the said phosphorus steam into the filter and controlling the pressure of inert gas for blowback at 0.2-1.0 MPa;
④ Operation during shutdown: injecting inert gas for replacement at the temperature above the dew point temperature of the said phosphorus steam into the filter, and keeping porous membrane element free of paste pollution under the protection of inert gas for replacement.

For the special phosphorous recovery device of the invention using the method for recovering yellow phosphorous from electric furnace phosphorus-producing furnace gas, it comprises the heat exchange chamber formed with the shell and the partition wall type heat exchanger arranged in the heat exchange chamber. The tail gas outlet and the furnace gas inlet connected with the output end of the dry dust removal system are arranged on the heat exchange chamber, the internal flow path of the partition wall type heat exchanger is connected with the low-temperature medium source and high-temperature medium source by the switchable unit respectively. Specifically, a fin-tube heat exchanger can be used as the said partition wall type heat exchanger. Fins in the fin-tube heat exchanger are preferably set in vertical direction, so yellow phosphorous can be conveniently dripped into the phosphorous recovering tank after being melted.

The method for production of yellow phosphorous by using phosphorus furnace with a large self baking electrode of the invention comprises the steps of:
1) Using the dry dust removal system for dust removal and purification of the said electric furnace phosphorus-producing furnace gas while making sure that the temperature of electric furnace phosphorus-producing furnace gas is above the dew point temperature of phosphorous steam in the electric furnace phosphorus-producing furnace gas, thereby making the solid content of the electric furnace phosphorus-producing furnace gas be less than 10-50 mg/m$^3$;
2) Delivering the purified furnace gas to a phosphorous recovery device which comprises a heat exchange chamber formed with the shell and a partition wall type heat exchanger arranged in the heat exchange chamber.

The said furnace gas is in full contact with the partition wall type heat exchanger after entering the heat exchange chamber;

3) Adding a low-temperature medium to the internal flow path of the partition wall type heat exchanger. The low-temperature medium and the said furnace gas are isolated by the partition wall type heat exchanger for heat transfer without being mixed, therefore, a large amount of yellow phosphorous is condensed, separated out and attached to the surface of the partition wall type heat exchanger, and tail gas is discharged from the phosphorous recovery device after heat exchange;

4) Adding a high-temperature medium to the internal flow path of the partition wall type heat exchanger to replace the low-temperature medium. The high-temperature medium and yellow phosphorous adhered to the surface of the partition wall type heat exchanger can transfer heat without being mixed, therefore, the yellow phosphorous is melted and dripped into a phosphorous recovering tank on the bottom of the phosphorous recovery device, and then obtained by the phosphorous recovering tank;

Wherein the said electric furnace phosphorus-producing furnace gas is a high-temperature furnace gas generated by delivering the mixture proportioned by phosphate ore, silica and coke into the phosphorus furnace with a large self baking electrode, generating furnace gas by the reduction reaction of the mixture in the phosphorus furnace with a large self baking electrode, making furnace gas escape from the molten zone of reaction, and discharging furnace gas with particle impurities of the mixture from the phosphorus furnace with a large self baking electrode after passing through the furnace gas filter layer formed by the continuously supplemented mixture in the upper part of the furnace.

The above method of the invention is to recover yellow phosphorous by condensation of electric furnace phosphorus-producing furnace gas by the following method instead of the spray cooling process of: using the partition wall type heat exchanger to add low-temperature medium to make a large amount of yellow phosphorous be condensed, separated out and adhered to the surface of the partition wall type heat exchanger, adding high-temperature medium to make yellow phosphorous adhered on the surface of the partition wall type heat exchanger, melted, dripped into the phosphorous recovering tank on the bottom of the phosphorous recovery device, and finally obtained so as to solve the problems of phosphorous sludge and wastewater, and reduce time for refining crude phosphorous and consumption of steam.

In the method, the temperature of the furnace gas inlet and the temperature of the tail gas outlet of the phosphorous recovery device should be controlled at 180-220° C. and 10-30° C. respectively. When the temperature of the furnace gas inlet of the phosphorous recovery device is lower than 180° C., phosphorous steam will be untimely condensed, resulting in reduction of recovery ratio of yellow phosphorous in the phosphorous recovery device; when the temperature of the furnace gas inlet of the phosphorous recovery device is lower than 220° C., it is not convenient for the phosphorous recovery device to rapidly condense phosphorous steam. When the temperature of the tail gas outlet of the phosphorous recovery device is controlled below 10° C., the unnecessary difficulty of refrigeration will be increased; when the temperature of the tail gas outlet of the phosphorous recovery device is more than 30° C. phosphorous steam cannot be sufficiently condensed, resulting in reduction of recovery ratio of yellow phosphorous.

The said low-temperature medium and high-temperature medium can be selected from various cold media and heat media applicable to the invention. The actual verification shows that chilled brine as low-temperature medium and vapor as high-temperature medium can reach better effect.

Furthermore, the said dry dust removal system comprises a filter for filtering electric furnace phosphorus-producing furnace gas. The filter has a porous membrane element meeting the following operating conditions. In view of the filter, operations shall be carried out including:

① Operation during startup: injecting preheating inert gas into the filter to preheat the porous membrane element over the dew point temperature of the said phosphorus steam in the filter;

② Operation during normal running: inputting furnace gas to be filtered at the temperature above the dew point temperature of the said phosphorus steam into the filter and making the dust content of clean furnace gas below 10-20 mg/m$^3$ after filtration;

③ Operation during blowback: starting the blowback unit to inject inert gas for blowback at the temperature above the dew point temperature of the said phosphorus steam into the filter and controlling the pressure of inert gas for blowback at 0.2-1.0 MPa;

④ Operation during shutdown: injecting inert gas for replacement at the temperature above the dew point temperature of the said phosphorus steam into the filter, and keeping porous membrane element free of paste pollution under the protection of inert gas for replacement.

When the temperature of furnace gas to be filtered in the filter is lower than the dew point temperature of the said phosphorus steam, phosphorus steam in furnace gas will be condensed, resulting in abnormal filter, therefore, furnace gas at the temperature above the dew point temperature of the said phosphorus steam shall be input into the filter in the said method. In addition, when the said filter is applied to the filtering environment of the phosphorus furnace gas, the technical problems including paste membrane pollution of filter and duct jamming caused by condensation of phosphorus steam due to the shock of temperature for sintering the surface of inorganic porous membrane element during startup, blowback and shutdown period of the filter also shall be overcome. Therefore, the above-mentioned means is adopted to inject inert gas for preheating, inert gas for blowback and inert gas for replacement at a certain temperature.

Generally, paste filter pollution can be prevented when the temperature of preheating inert gas, inert gas for blowback and inert gas for replacement is controlled above the dew point temperature of the said phosphorus steam. The temperature of preheating inert gas, inert gas for blowback and inert gas for replacement is preferably controlled to be basically consistent with the temperature of furnace gas to be filtered in the filter (when the temperature of furnace gas to be filtered in the filter is higher than the dew point temperature of the said phosphorus steam) so as to stabilize the temperature of filter and improve the service life of filter.

The obvious advantage for using the filter with porous membrane element also includes high dust collecting precision. The requirement for dust collection precision of the filter shall be that the dust content of clean furnace gas is less than 10-20 mg/m$^3$ after filtration. In order to meet the requirement, the porous membrane element with corresponding aperture can be selected. The test shows that the best way to ensure stable operation of the porous membrane element for long time is to control the pressure of inert gas for blowback at 0.2-1.0 MPa when the dust content of clean furnace gas filtered by the filter is less than 20 mg/m$^3$ in the filtering environment of the phosphorus furnace gas.

Since the temperature of electric furnace phosphorus-producing furnace gas produced by the phosphorus furnace with a large self baking electrode is often high, the requirement of temperature of furnace gas to be filtered in the filter above the dew point temperature of phosphorous team can be completely met. Furthermore, the temperature of furnace gas to be filtered in the filter is certainly kept at 420-590° C. by installing the heat exchanger on the flue connecting the electric furnace and the dry dust removal system, or/and adjusting the thickness of the said furnace gas filter layer in the electric furnace, or/and adjusting the electrode power on the premise that the mixture is strictly treated.

In general, the temperature of furnace gas to be filtered in the filter can be kept at 420-590° C. after furnace gas is properly heated via the heat exchanger, the thickness of the furnace gas filter layer is slightly reduced or voltage and current are slightly increased to improve electrode power. The temperature of furnace gas to be filtered in the filter at 420-590° C. is far above the dew point causing condensation of phosphorus steam in furnace gas, as a result, the filter can work normally. Meanwhile, the recovery ratio of yellow phosphorus is high when the filtering temperature is 420-590° C. On this basis, the recovery ratio of yellow phosphorus is high when the temperature of furnace gas to be filtered in the filter is further preferably at 420-530° C.

The temperature of clean furnace gas discharged from the filter is still high when the temperature of furnace gas to be filtered in the filter is 420-530° C., then, the furnace gas output from the filter can enter into the phosphorous recovery device after being cooled to 180-220° C. in the exhaust heat boiler. The exhaust heat boiler is mainly used to lower the temperature of furnace gas (the exhaust heat boiler also can be used to recover heat); therefore, regardless of any cooling device used, the device is for cooling furnace gas by the same technical means as the exhaust heat boiler.

The apparatus for the method using phosphorus furnace with a large self baking electrode for yellow phosphorus production comprises the dry dust removal system and the phosphorous recovery device connected with the dry dust removal system. The said dry dust removal system is used for dedusting and purifying the said electric furnace phosphorus-producing furnace gas when the temperature of the electric furnace phosphorus-producing furnace gas is above the dew point temperature of phosphorous steam in electric furnace phosphorus-producing furnace gas, as a result, the solid content of electric furnace phosphorus-producing furnace gas is less than 10-50 mg/m$^3$. The said phosphorous recovery device comprises the heat exchange chamber formed with the shell and the partition wall type heat exchanger arranged in the heat exchange chamber. The tail gas outlet and the furnace gas inlet connected with the output end of the dry dust removal system are arranged on the heat exchange chamber, the internal flow path of the partition wall type heat exchanger is connected with the low-temperature medium source and high-temperature medium source by the switchable unit respectively.

Furthermore, the said dry dust removal system comprises a filter for filtering electric furnace phosphorus-producing furnace gas. The filter has a porous membrane element meeting the following operating conditions. In view of the filter, operations shall be carried out including:
① Operation during startup: injecting preheating inert gas into the filter to preheat the porous membrane element in the filter over the dew point temperature of phosphorus steam in electric furnace phosphorus-producing furnace gas;
② Operation during normal running: inputting furnace gas to be filtered at the temperature above the dew point temperature of the said phosphorus steam into the filter and making the dust content of clean furnace gas below 10-20 mg/m$^3$ after filtration.
③ Operation during blowback: starting the blowback unit to inject inert gas for blowback at the temperature above the dew point temperature of the said phosphorus steam into the filter and controlling the pressure of inert gas for blowback at 0.2-1.0 MPa;
④ Operation during shutdown: injecting inert gas for replacement at the temperature above the dew point temperature of the said phosphorus steam into the filter, and keeping porous membrane element free of paste pollution under the protection of inert gas for replacement.

Furthermore, the temperature of furnace gas to be filtered in the filter is kept at 420-590° C.; the exhaust heat boiler is arranged between the filter and the phosphorous recovery device for cooling furnace gas output from the filter to 180-220° C. and adding furnace gas to the phosphorous recovery device.

In addition, the fin-tube heat exchanger is used as the said partition wall type heat exchanger.

The invention will be further described in combination with drawings and embodiments, some additional aspects and advantages of the invention are given in the following description, and these additional aspects and advantages can be obvious through the description below or learned through the practice of the invention.

DETAILED DESCRIPTION OF THE PREFERRED EMBODIMENT

Figure 1:
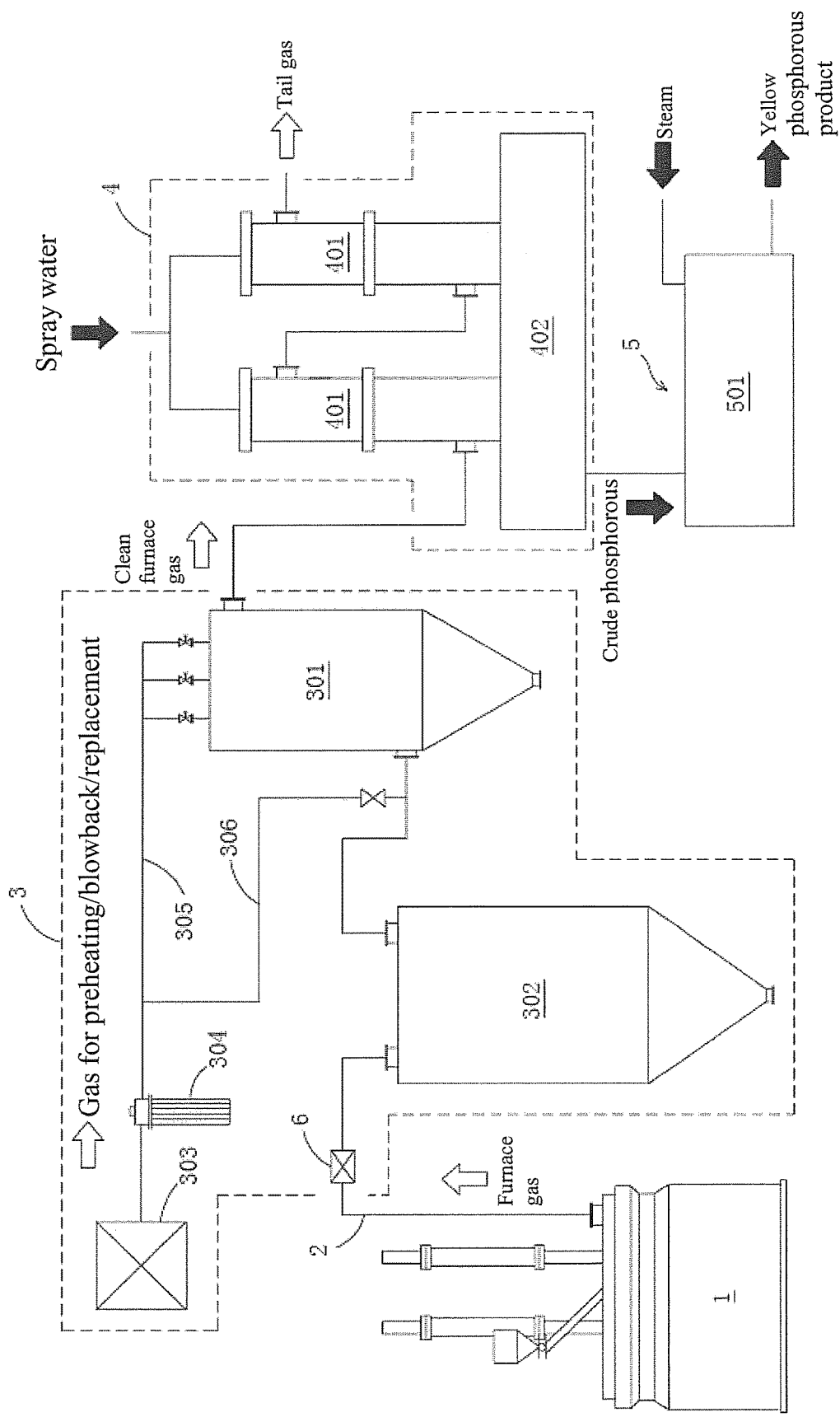
FIG. 1 is a flow chart of the yellow phosphorus process provided by the applicant in Chinese patent application No. 2013104546439.

FIG. 1 is a flow chart of the yellow phosphorus process provided by the applicant in Chinese patent application No. 2013104546439. Although the technical scheme in the patent application of the invention is improved, Chinese patent application No. 2013104546439 is described herein in order to facilitate accurate understanding of the invention.

For the yellow phosphorus process flow shown in FIG. 1, an electric furnace 1 is connected with a dry dust removal system 3 by a gas exhaust duct 2 (a heat exchanger 6 is arranged on the gas exhaust duct 2), the dust removal device of the dry dust removal system 3 is composed of a filter 301 and a mechanical dust collector 302 arranged between the filter 301 and the electric furnace 1, furnace gas discharged from the electric furnace 1 enters the mechanical dust collector 302 by the gas exhaust duct 2 for primary dust removal and purification, and then enters the filter 301 for secondary dust removal and purification. Clean furnace gas discharged from the filter 301 is introduced into a condensation and recovery system 4 which is composed of a spray column 401 and a collecting tank 402. Yellow phosphorus sprayed and condensed by the spray column 401 enters the collecting tank 402 to give crude phosphorus, and then crude phosphorus is refined in a crude phosphorus refining system 5. The crude phosphorus refining system 5 comprises a refining boiler 501. Pure phosphorus is deposited on the bottom of the boiler after crude phosphorus is heated, mixed and settled with steam in the refining boiler 501. Tail gas (CO, etc.) discharged from the spray column 401 is led into two paths, one is taken as fuel after further purification, and the other is vented out when not in use. In addition, the filter 301 is also connected with a gas supplying unit 303 which supplies preheating inert gas, inert gas for blowback and inert gas for replacement for the filter 301. The gas supplying unit 303 is connected with a first output tube 305 and a second output tube 306 by a heater 304 respectively. The output end of the first output tube 305 is connected with a blowback unit of the filter 301, and the output end of the second output tube 306 is connected with an intake tube of furnace gas to be filtered of the filter. Valves are arranged on the first output tube 305 and the second output tube 306. Wherein the gravity dust collector and the cyclone dust collector also can be used as the mechanical dust collector 302. Multiple sintering inorganic porous membrane elements are arranged and installed in the filter 301 by an orifice plate. A venturi tube for blowback is arranged on each set of sintering inorganic porous membrane elements. Inert gas for blowback entering each of the venturi tubes is controlled by a pulse valve respectively. Each pulse valve is connected with the first output tube shown as FIG. 1 by an air pocket (not shown in the figure).

The yellow phosphorus process flow thereof is specifically described by multiple examples in Chinese patent application No. 2013104546439. The examples are divided into two groups, the Example Group 1 relates to method 1 using phosphorus furnace with multiple electrodes and the Example Group 2 relates to method II using phosphorus furnace with a large self baking electrode. For comparison, all examples use the same set of apparatus in every group, the raw material is separated from the same batch of material (treated by existing technology) with the same ore grade, proportion and treatment process. In order to accurately compare the recovery ratio of yellow phosphorus obtained from all examples in every group of examples, the refining boilers (501) (each example corresponds to a refining boiler 501) consistent with examples in quantity are designed in the crude phosphorus refining system 5, and the outlet of the condensation and recovery system 4 can be switched among these refining boilers 501. The outlet is switched to corresponding refining boiler 501 after the raw material in one example is completely reacted and phosphorus recovering process is ended and when the next batch of raw material (i.e., raw materials of another example) is added. As a result, the recovery ratio of yellow phosphorus of these examples can be obtained by calculating the amount of yellow phosphorus obtained from each refining boiler 501.

Example Group 1

Example 1

Use the phosphorus furnace with multiple electrodes with a transformer capacity of 15,000 KVA. Continuously add 50 ton of mixture to the electric furnace 1 for reaction, start the gas supplying unit 303 and the heater 304 at the same time, make high-temperature inert gas for preheating enter the filter 301 from the intake tube of furnace gas to be filtered of the filter 301 by the second output tube 306, thereby preheat the sintering inorganic porous membrane element (porous membrane element of FeAl intermetallic compound) in the filter 301 to 187.5° C., and close the valve on the second output tube 306. Then, introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 200° C. on the intake tube of furnace gas to be filtered of the filter 301. Carry out online blowback of the filter 301 once every 600 s, heat inert gas for blowback output from the gas supplying unit 303 to 187.5° C. by the heater 304 during blowback, make the inert gas for blowback work on the sintering inorganic porous membrane element, and set the pressure of inert gas for blowback to be 0.6 MPa. The dust content of clean furnace gas is about 5 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 98.5% which is far above 72-87% of the existing recovery ratio.

Example 2

After completion of Example 1, directly use the apparatus to continuously carry out Example 2. Continuously add the second batch of 50 ton of mixture to the electric furnace 1 for reaction, and switch to another refining boiler 501. Introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 250° C. on the intake tube of furnace gas to be filtered of the filter 301. Carry out online blowback of the filter 301 once every 600 s, heat inert gas for blowback output from the gas supplying unit 303 to 187.5° C. by the heater 304 during blowback, make the inert gas for blowback work on the sintering inorganic porous membrane element, and set the pressure of inert gas for blowback to be 0.6 MPa. The dust content of clean furnace gas is about 5 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 97%.

Example 3

After completion of Example 2, directly use the apparatus to continuously carry out Example 3. Continuously add the third batch of 50 ton of mixture to the electric furnace 1 for reaction, and switch to another refining boiler 501. Introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 300° C. on the intake tube of furnace gas to be filtered of the filter 301. Carry out online blowback of the filter 301 once every 600 s, heat inert gas for blowback output from the gas supplying unit 303 to 187.5° C. by the heater 304 during blowback, make the inert gas for blowback work on the sintering inorganic porous membrane element, and set the pressure of inert gas for blowback to be 0.6 MPa. The dust content of clean furnace gas is about 5 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 89%.

After completion of Example 3, inject inert gas for replacement at 187.5° C. into the filter 301 by the gas supplying unit 303, the heater 304 and the second output tube 306 so as to keep porous membrane element free of paste membrane pollution under the protection of inert gas for replacement.

Example Group 2 (with Another Set of Apparatus Adopted)

Example 4

Use the phosphorus furnace with a large self baking electrode with a transformer capacity of 74,750 KVA. Continuously add 100 ton of mixture to the electric furnace 1 for reaction, start the gas supplying unit 303 and the heater 304 at the same time, make high-temperature inert gas for preheating enter the filter 301 from the intake tube of furnace gas to be filtered of the filter 301 by the second output tube 306, thereby preheat the sintering inorganic porous membrane element (porous membrane element of FeAl intermetallic compound) in the filter 301 to 400° C., and close the valve on the second output tube 306. Then, introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 390° C. on the intake tube of furnace gas to be filtered of the filter 301. Carry out online blowback of the filter 301 once every 400 s, heat inert gas for blowback output from the gas supplying unit 303 to 400° C. by the heater 304 during blowback, make the inert gas for blowback work on the sintering inorganic porous membrane element, and set the pressure of inert gas for blowback to be 0.8 MPa. The dust content of clean furnace gas is about 6 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 97.5%.

Example 5

After completion of Example 4, directly use the apparatus to continuously carry out Example 5. Continuously add the second batch of 100 ton of mixture to the electric furnace 1 for reaction, and switch to another refining boiler 501. Introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 430° C. on the intake tube of furnace gas to be filtered of the filter 301. Carry out online blowback of the filter 301 once every 400 s, heat inert gas for blowback output from the gas supplying unit 303 to 400° C. by the heater 304 during blowback, make the inert gas for blowback work on the sintering inorganic porous membrane element, and set the pressure of inert gas for blowback to be 0.8 MPa. The dust content of clean furnace gas is about 6 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 98%.

Example 6

After completion of Example 5, directly use the apparatus to continuously carry out Example 6. Continuously add the third batch of 100 ton of mixture to the electric furnace 1 for reaction, and switch to another refining boiler 501. Introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 500° C. on the intake tube of furnace gas to be filtered of the filter 301. Carry out online blowback of the filter 301 once every 400 s, heat inert gas for blowback output from the gas supplying unit 303 to 400° C. by the heater 304 during blowback, make the inert gas for blowback work on the sintering inorganic porous membrane element, and set the pressure of inert gas for blowback to be 0.8 MPa. The dust content of clean furnace gas is about 6 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 98.5%.

Example 7

After completion of Example 6, directly use the apparatus to continuously carry out Example 7. Continuously add the fourth batch of 100 ton of mixture to the electric furnace 1 for reaction, and switch to another refining boiler 501.

Introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 550° C. on the intake tube of furnace gas to be filtered of the filter 301. Carry out online blowback of the filter 301 once every 400 s, heat inert gas for blowback output from the gas supplying unit 303 to 400° C. by the heater 304 during blowback, make the inert gas for blowback work on the sintering inorganic porous membrane element, and set the pressure of inert gas for blowback to be 0.8 MPa. The dust content of clean furnace gas is about 6 mg/m$^3$ after filtration. Crude phosphorus enters corresponding refining boiler 501 after passing through the condensation and recovery system 4 to obtain yellow phosphorus product, and few phosphorus sludge is produced and the dust content in tail gas is very low. Calculate the recovery ratio of yellow phosphorus to be 98%.

Example 8

After completion of Example 7, directly use the apparatus to continuously carry out Example 8. Continuously add the fifth batch of 100 ton of mixture to the electric furnace 1 for reaction, and switch to another refining boiler 501. Introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 620° C. on the intake tube of furnace gas to be filtered of the filter 301. Carry out online blowback of the filter 301 once every 400 s, heat inert gas for blowback output from the gas supplying unit 303 to 400° C. by the heater 304 during blowback, make the inert gas for blowback work on the sintering inorganic porous membrane element, and set the pressure of inert gas for blowback to be 0.8 MPa. The dust content of clean furnace gas is about 6 mg/m$^3$ after filtration. Crude phosphorus enters corresponding refining boilers 501 after passing through the condensation and recovery system 4 to obtain yellow phosphorus product, and few phosphorus sludge is produced and the dust content in tail gas is very low. Calculate the recovery ratio of yellow phosphorus to be 90%.

Figure 2:
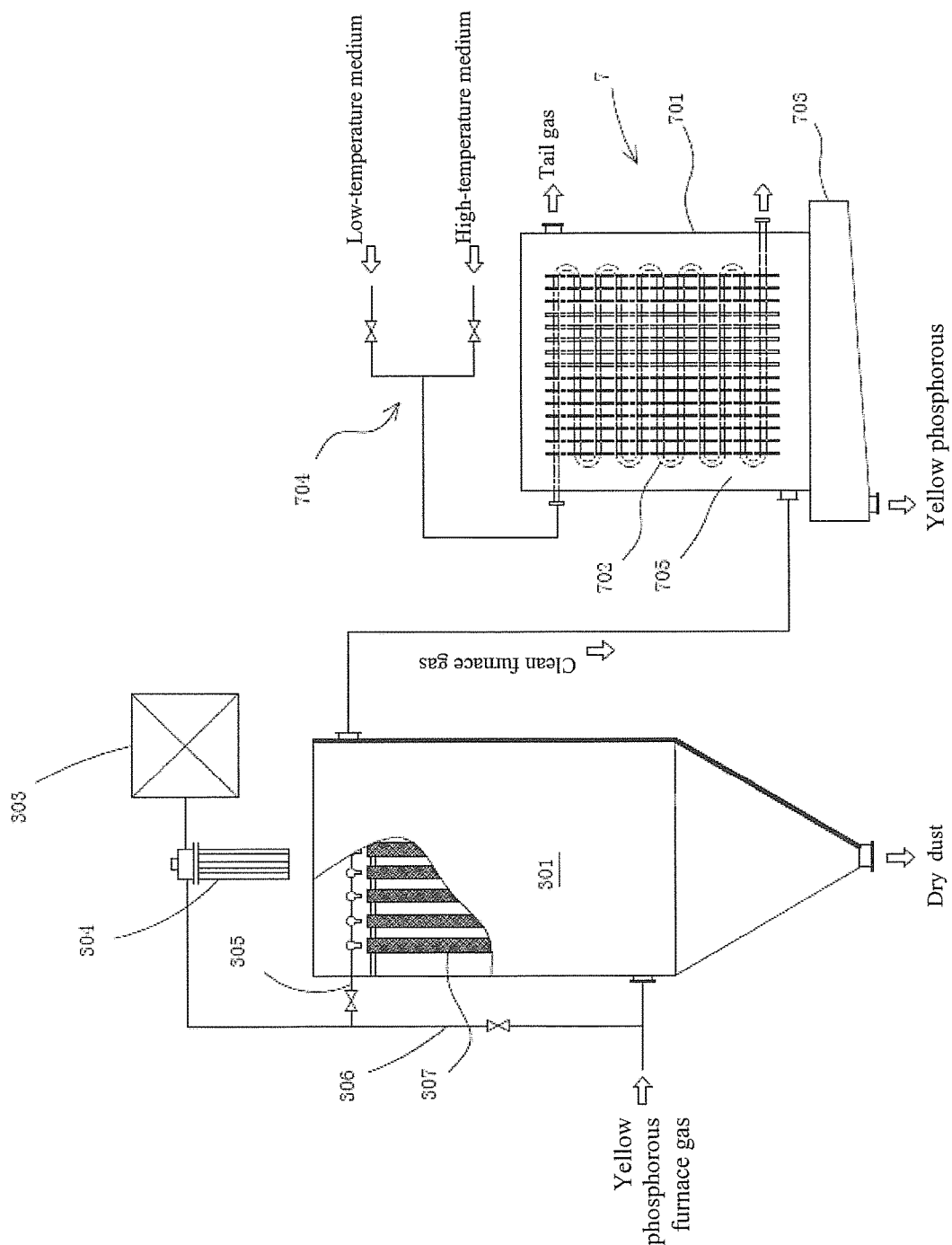
FIG. 2 is a process schematic diagram of an embodiment of the invention.
Figure 3:
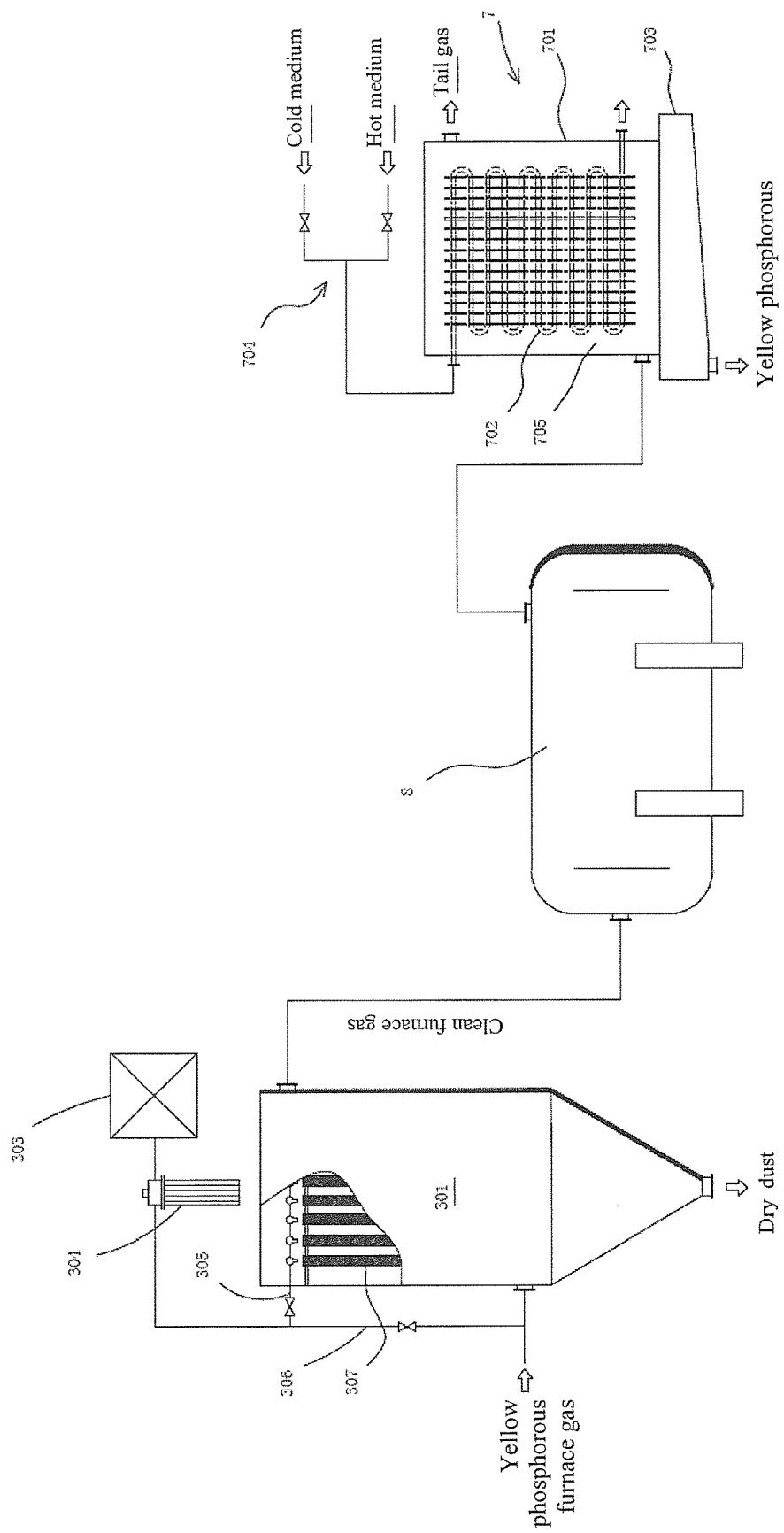
FIG. 3 is a process schematic diagram of another embodiment of the invention.
Figure 4:
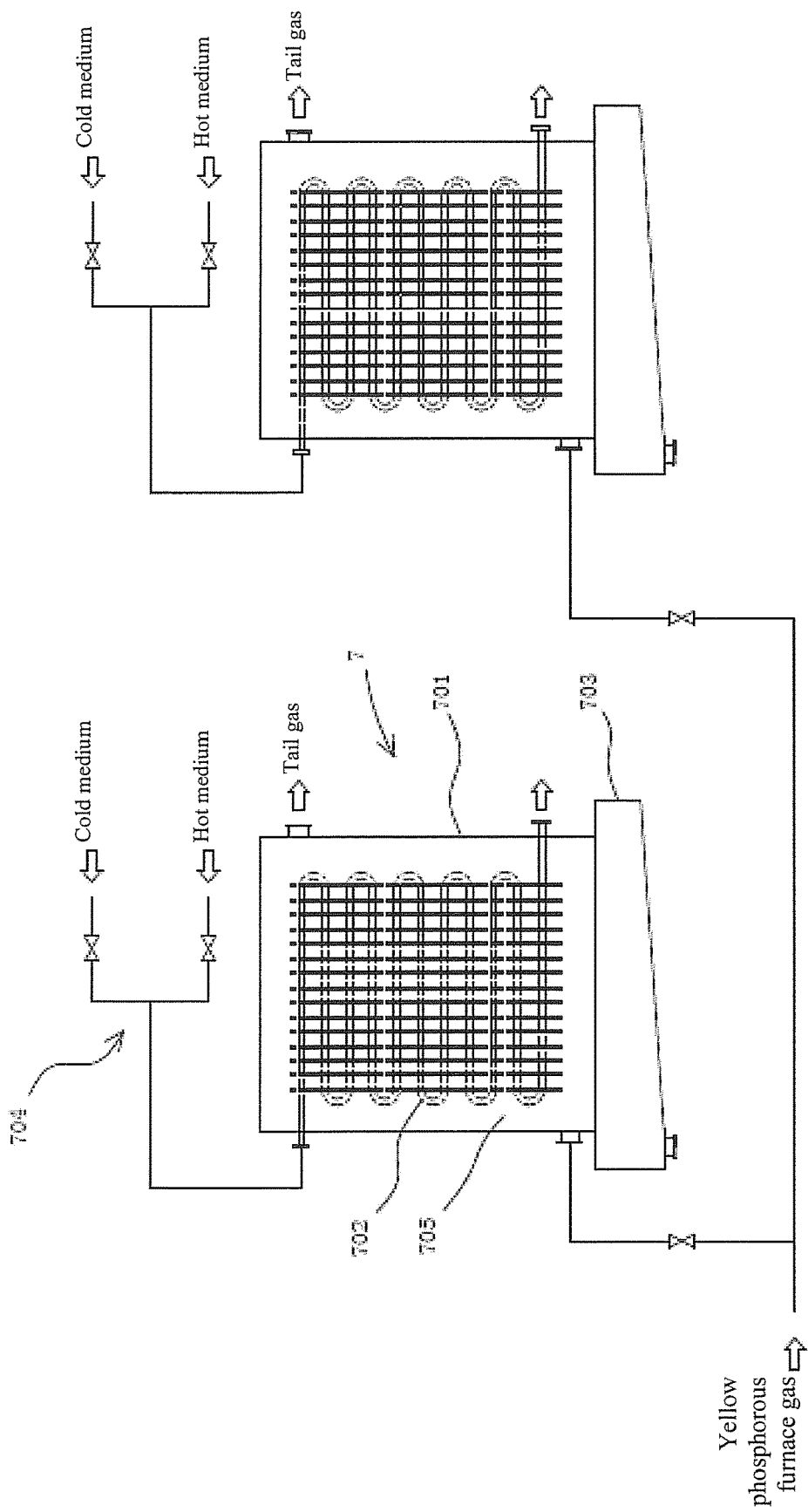
FIG. 4 is a layout schematic diagram of a plurality of phosphorous recovery devices of the invention.

To implement the yellow phosphorus recovering process of the invention, the condensation and recovery system 4 as shown in FIG. 1 is replaced with the special phosphorous recovery device. As shown in FIGS. 2, 3 and 4, the phosphorous recovery device 7 comprises a heat exchange chamber 705 formed with the shell 701 and a partition wall type heat exchanger 702 arranged in the heat exchange chamber 705, a tail gas outlet and a furnace gas inlet which is connected with the output end of the dry dust removal system are arranged on the heat exchange chamber 705, and the internal flow path of the partition wall type heat exchanger 702 is connected with the low-temperature medium source and high-temperature medium source by a switchable unit respectively. In the following examples, chilled brine (at 10-20° C.) will be used as low-temperature medium source and vapor (at 120-150° C.) will be used as high-temperature medium. In the invention, a fin-tube heat exchanger can be used as the partition wall type heat exchanger 702 of the phosphorous recovery device 7. Fins in the fin-tube heat exchanger are vertically set.

During actual production, multiple phosphorous recovery devices 7 shall be arranged in the production line as shown in FIG. 4 to continuously treat furnace gas. Furnace gas from the output end of the dry dust removal system can selectively enter some phosphorous recovery devices 7 through controlling of valves, and the phosphorous recovery device 7 filled with furnace gas is switched to fill low-temperature medium to the internal flow path of the partition wall type heat exchanger 702 by the switchable unit 704 (e.g., a two-position three-way valve) so as to condense furnace gas in the phosphorous recovery device 7; other phosphorous recovery devices not filled with furnace gas are switched to fill high-temperature medium to the internal flow path of the partition wall type heat exchanger 702 by the switchable units 704 so as to heat and melt the precipitated yellow phosphorus. After these phosphorous recovery devices 7 switched to fill low-temperature medium to the internal flow path of the partition wall type heat exchanger 702 are accompanied by a large amount of yellow phosphorus (it can be judged by the tail gas temperature of the phosphorous recovery devices 7, the increased tail gas temperature indicates reduced heat exchange efficiency) after working for a period of time, these phosphorous recovery devices 7 are switched to fill high-temperature medium to the internal flow path of the partition wall type heat exchanger 702, the phosphorous recovery devices 7 not filled with furnace gas are switched to fill low-temperature medium source to the internal flow path of the partition wall type heat exchanger 702, and furnace gas from the output end of the dry dust removal system is added to these phosphorous recovery devices 7 switched to fill low-temperature medium to the internal flow path of the partition wall type heat exchanger 702. Thus, furnace gas can be continuously condensed by the phosphorous recovery devices 7.

Example 9

Use the phosphorus furnace with multiple electrodes with a transformer capacity of 15,000 KVA. Continuously add 50 ton of mixture (ore grade, proportion and treatment process are same as those in Example 1) to the electric furnace 1 for reaction, start the gas supplying unit 303 and the heater 304 at the same time, make high-temperature inert gas for preheating enter the filter 301 from the intake tube of furnace gas to be filtered of the filter 301 by the second output tube 306, thereby preheat the sintering inorganic porous membrane element (porous membrane element of FeAl intermetallic compound) in the filter 301 to 187.5° C., and close the valve on the second output tube 306. Then, introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 200° C. on the intake tube of furnace gas to be filtered of the filter 301. Carry out online blowback of the filter 301 once every 600 s, heat inert gas for blowback output from the gas supplying unit 303 to 187.5° C. by the heater 304 during blowback, make the inert gas for blowback work on the sintering inorganic porous membrane element, and set the pressure of inert gas for blowback to be 0.6 MPa. Make the clean furnace gas with dust content of about 5 mg/m after filtration enter one phosphorous recovery device 7 as shown in FIG. 4 at about 180° C. Switch the phosphorous recovery device 7 to fill low-temperature medium (the said chilled brine) to the internal flow path of the partition wall type heat exchanger 702 so as to condense furnace gas entering the phosphorous recovery device 7. The temperature of the tail gas outlet of the phosphorous recovery device 7 is 10-20° C. After the phosphorous recovery device 7 works for a period of time, close the valve in front of furnace gas inlet of the phosphorous recovery device 7 and open the valve in front of furnace gas inlet of another phosphorous recovery device 7 to fill clean furnace gas at about 180° C. to another phosphorous recovery device 7 and continuously condense furnace gas. Switch the phosphorous recovery device 7 for condensing furnace gas previously to fill high-temperature medium (the said vapor) to the internal flow path of the partition wall type heat exchanger 702 by the switchable unit 704 so as to melt yellow phosphorus and drip yellow phosphorus into the phosphorus recovering tank 703 on the bottom of the phosphorous recovery device 7. Introduce crude phosphorus obtained from the phosphorus recovering tank 703 of respective phosphorous recovery device 7 into the refining boiler 501 to obtain yellow phosphorus product, and few phosphorus sludge is produced and the dust content in tail gas is very low. Calculate the recovery ratio of yellow phosphorus to be 99%.

Example 10

Use the phosphorus furnace with a large self baking electrode with a transformer capacity of 74,750 KVA. Continuously add 100 ton of mixture (ore grade, proportion and treatment process are same as those in Example 4) to the electric furnace 1 for reaction, start the gas supplying unit 303 and the heater 304 at the same time, make high-temperature inert gas for preheating enter the filter 301 from the intake tube of furnace gas to be filtered of the filter 301 by the second output tube 306, thereby preheat the sintering inorganic porous membrane element (porous membrane element of FeAl intermetallic compound) in the filter 301 to 400° C., and close the valve on the second output tube 306. Then, introduce furnace gas discharged from the electric furnace 1 into the dry dust removal system 3 by the gas exhaust duct 2, meanwhile, heat furnace gas by the heat exchanger 6. Make the heated furnace gas discharged from the electric furnace 1 enter the mechanical dust collector 302 for primary dust removal and purification by the gas exhaust duct 2, and then enter the filter 301 for secondary dust removal and purification. Detect the temperature of furnace gas to be filtered and keep it at about 390° C. on the intake tube of furnace gas to be filtered of the filter 301. Carry out online blowback of the filter 301 once every 400 s, heat inert gas for blowback output from the gas supplying unit 303 to 400° C. by the heater 304 during blowback, make the inert gas for blowback work on the sintering inorganic porous membrane element, and set the pressure of inert gas for blowback to be 0.8 MPa. Make clean furnace gas with dust content of about 6 mg/m$^3$ enter the exhaust heat boiler 8 as shown in FIG. 3 after filtration, and recover quantity of heat in furnace gas. Enter one phosphorous recovery device 7 as shown in FIG. 4 when the output temperature of the exhaust heat boiler 8 is about 180° C. Switch the phosphorous recovery device 7 to fill low-temperature medium (the said chilled brine) to the internal flow path of the partition wall type heat exchanger 702 so as to condense furnace gas entering the phosphorous recovery device 7. The temperature of the tail gas outlet of the phosphorous recovery device 7 is 10-20° C. After the phosphorous recovery device 7 works for a period of time, close the valve in front of furnace gas inlet of the phosphorous recovery device 7 and open the valve in front of furnace gas inlet of another phosphorous recovery device 7 to fill clean furnace gas at about 180° C. to another phosphorous recovery device 7 and continuously condense furnace gas. Switch the phosphorous recovery device 7 for condensing furnace gas previously to fill high-temperature medium (the said vapor) to the internal flow path of the partition wall type heat exchanger 702 by the switchable unit 704 so as to melt yellow phosphorus and drip yellow phosphorus into the phosphorus recovering tank 703 on the bottom of the phosphorous recovery device 7. Introduce crude phosphorus obtained from the phosphorus recovering tank 703 of respective phosphorous recovery device 7 into the refining boiler 501 to obtain yellow phosphorus product, and few phosphorus sludge is produced and the dust content in tail gas is very low. Calculate the recovery ratio of yellow phosphorus to be 98.6%.

We claim:
1. A method for recovering yellow phosphorus from furnace gas resulting from preparing phosphorus in an electric furnace, comprising:
   1) dedusting and purifying the furnace gas using a dry dedusting system when the temperature of the electric furnace is at least the dew point temperature of the phosphorous vapor in the furnace gas, which results in a solid content of the furnace gas to be 10-50 mg/m$^3$;
   2) the purified furnace gas is delivered to a phosphorus collecting apparatus (7) having a heat exchanging chamber (705) consisting of a shell (701) and a recuperator (702) set in the heat exchanging chamber (705), and said furnace gas flows into the heat exchanging chamber (705) so as to fully contact with the recuperator (702);
   3) a low temperature medium is introduced into the internal flow path of the recuperator (702), the low temperature medium and said furnace gas are heat transferred by a non-mixing means under the isolation of the recuperator (702), so that the yellow phosphorus is condensed, precipitated and adhered to the surface of the recuperator (702), and the exhaust gas after heat exchanging is discharged from the phosphorus collecting apparatus (7); and
   4) a high temperature medium for replacing the low temperature medium is introduced into the internal flow path of the recuperator (702), the high temperature medium and the yellow phosphorus adhered to the surface of the recuperator (702) are heat transferred by the non-mixing means, so that the yellow phosphorus melts and drops into a phosphorus collecting tank (703) at the bottom of the phosphorus collecting apparatus (7), and then the yellow phosphorus is obtained through the phosphorus collecting tank (703).

2. The method of claim 1 is characterized in that: the furnace gas inlet temperature of the phosphorus collecting apparatus (7) is controlled at 180-220° C., and the exhaust gas outlet temperature of the phosphorus collecting apparatus (7) is controlled at 10-30° C.

3. The method of claim 1 is characterized in that: said low temperature medium is selected from chilled brine; and said high temperature medium is selected from water vapor.

4. The method of claim 1, wherein the dry dedusting system comprises a filter (301) having a filter element (307) with a porous material membrane, further comprising:

1) at power-on, injecting inert preheating gas into the filter (301) to preheat the filter element to a temperature equal to or more than said dew point temperature of the phosphorus vapor;
2) at normal running, introducing the furnace gas to be filtered with the temperature kept at equal to or more than the dew point temperature of the phosphorus vapor into the filter (301), and the dust content of the clean furnace gas after filtering is equal to or less than 10-20 mg/m$^3$,
3) at back flushing, starting a back flushing apparatus, and injecting the inert back flushing gas with the temperature equal to or more than said dew point temperature of the phosphorus vapor and with the pressure controlled at 0.2-1.0 MPa into the filter (301); and
4) at powering-off, injecting the inert replacing gas with a temperature equal to or more than said dew point temperature of the phosphorus vapor into the filter (301), so that the filter element is protected by the inert replacing gas from paste film contamination.

5. The method of anyone of claims 1-4 is characterized in that: said furnace gas resulting from preparing phosphorus by the electric furnace is produced by the following steps of that: a mixture proportionally prepared by phosphorus ore, silica and coke is fed into a multi-electrode phosphorus-preparing electric furnace, a reduction reaction is performed by the mixture within the multi-electrode phosphorus-preparing electric furnace to generate the furnace gas, and the furnace gas escapes from the reacting and melting zone, passes through a furnace gas filtering layer which is formed within the upper portion of the furnace by the mixture continuously supplied, then carries a part of impurities in the mixture, and is discharged from the multi-electrode phosphorus-preparing electric furnace; thus, the furnace gas temperature in the dry dedusting system is kept at a temperature equal to or more than said dew point temperature of the phosphorus vapor by installing a heat exchanging apparatus on a smoke exhausting duct connecting the electric furnace to the dry dedusting system, or/and adjusting the thickness of said furnace gas filtering layer in the electric furnace, or/and adjusting the electrode power when strictly performing the mixture treatment.

6. The method of claim 5 is characterized in that: the temperature of the furnace gas to be filtered and fed into the filter (301) is kept at 187.5-280° C.

7. A method for producing yellow phosphorus by using a large-scale phosphorus-preparing electric furnace with self-baking electrodes comprising:

1) dedusting and purifying the furnace gas using a dry dedusting system when the temperature of the electric furnace is at least the dew point temperature of the phosphorous vapor in the furnace gas, which results in a solid content of the furnace gas to be 10-50 mg/m$^3$;
2) the purified furnace gas is delivered to a phosphorus collecting apparatus (7) having a heat exchanging chamber (705) consisting of a shell (701) and a recuperator (702) set in the heat exchanging chamber, and said furnace gas flows into the heat exchanging chamber (705) so as to fully contact with the recuperator (702);
3) a low temperature medium is introduced into the internal flow path of the recuperator (702), the low temperature medium and said furnace gas are heat transferred by a non-mixing means under the isolation of the recuperator (702), so that the yellow phosphorus is condensed, precipitated and adhered to the surface of the recuperator (702), and the exhaust gas after heat exchanging is discharged from the phosphorus collecting apparatus (7); and
4) a high temperature medium for replacing the low temperature medium is introduced into the internal flow path of the recuperator (702), the high temperature medium and the yellow phosphorus adhered to the surface of the recuperator (702) are heat transferred by the non-mixing means, so that the yellow phosphorus melts and drops into a phosphorus collecting tank (703) at the bottom of the phosphorus collecting apparatus (7), and then the yellow phosphorus is obtained through the phosphorus collecting tank (703);

wherein, said furnace gas resulting from preparing phosphorus by the electric furnace is the high temperature furnace gas produced by the following steps of that: a mixture proportionally prepared by phosphorus ore, silica and coke is fed into the large-scale phosphorus-preparing electric furnace with self-baking electrodes, a reduction reaction is performed by the mixture within the large-scale phosphorus-preparing electric furnace with self-baking electrodes to generate the furnace gas, and the furnace gas escapes from the reacting and melting zone, passes through a furnace gas filtering layer which is formed within the upper portion of the furnace by the mixture continuously supplied, then carries a part of impurities in the mixture, and is discharged from the large-scale phosphorus-preparing electric furnace with self-baking electrodes.

* * * * *